(12) United States Patent
Crose

(10) Patent No.: US 6,554,356 B1
(45) Date of Patent: Apr. 29, 2003

(54) SHOCK ABSORBING VEHICLE SEAT FRAME

(75) Inventor: Corwin L. Crose, Three Rivers, MI (US)

(73) Assignee: The C.E. White Co., New Washington, OH (US)

( * ) Notice: Subject to any disclaimer, the term of this patent is extended or adjusted under 35 U.S.C. 154(b) by 143 days.

(21) Appl. No.: 09/714,684

(22) Filed: Nov. 16, 2000

Related U.S. Application Data

(60) Provisional application No. 60/228,650, filed on Aug. 29, 2000, and provisional application No. 60/168,010, filed on Nov. 30, 1999.

(51) Int. Cl.$^7$ .............................................. B60N 2/42
(52) U.S. Cl. ........................... 297/216.13; 297/452.2
(58) Field of Search .................... 297/452.18, 452.2, 297/216.1, 216.13, 216.14

(56) References Cited

U.S. PATENT DOCUMENTS

| | | |
|---|---|---|
| 2,227,717 A | 1/1941 | Jones |
| 2,682,931 A | 7/1954 | Young |
| 2,823,730 A | 2/1958 | Lawrence |
| 2,933,127 A | 4/1960 | Brewster |
| 3,460,791 A | 8/1969 | Judd |
| 3,463,543 A | 8/1969 | Zellar |
| 3,897,974 A | 8/1975 | Barecki |
| 3,953,068 A | 4/1976 | Porsche et al. |
| 4,487,383 A | 12/1984 | Mazelsky |
| 4,738,485 A | 4/1988 | Rumpf |
| 5,219,202 A * | 6/1993 | Rink et al. |
| 5,222,709 A | 6/1993 | Culley, Jr. et al. |
| 5,295,729 A | 3/1994 | Viano |
| 5,382,083 A | 1/1995 | Fecteau et al. |
| 5,501,509 A * | 3/1996 | Urrutia |
| 5,507,555 A | 4/1996 | Kiguchi |
| 5,641,198 A * | 6/1997 | Steffens, Jr. |
| 5,669,661 A | 9/1997 | Pajon |
| 5,676,421 A * | 10/1997 | Brodsky |
| 6,053,580 A | 4/2000 | White, Sr. |
| 6,074,004 A * | 6/2000 | Carmichael |

FOREIGN PATENT DOCUMENTS

| | | | |
|---|---|---|---|
| DE | 4303006 | * 2/1993 | |
| EP | 0 556 884 A2 | 8/1993 | |
| FR | 2744961 | 8/1998 | ............ 2/42 |
| GB | 2 303 297 A | 2/1997 | |

* cited by examiner

*Primary Examiner*—Milton Nelson, Jr.
(74) *Attorney, Agent, or Firm*—Calfee, Halter & Griswold LLP

(57) ABSTRACT

The frame of a crash resistant school bus seat is designed to undergo plastic flow when an impact is applied to the back rest portion of the seat. One or more stopping mechanisms are provided to retard movement of the back rest farther than a predetermined limit, thereby keeping a passenger in an upright position in the seat as a result of a crash. The frame is made from inexpensive, off-the-shelf metal tube and sheet stock and hence is inexpensive to design and build.

34 Claims, 4 Drawing Sheets

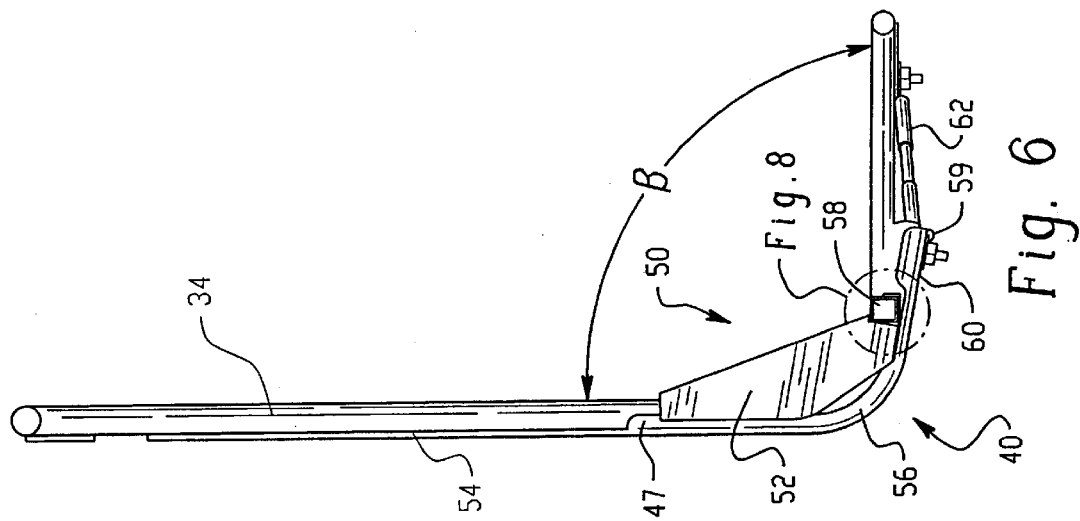
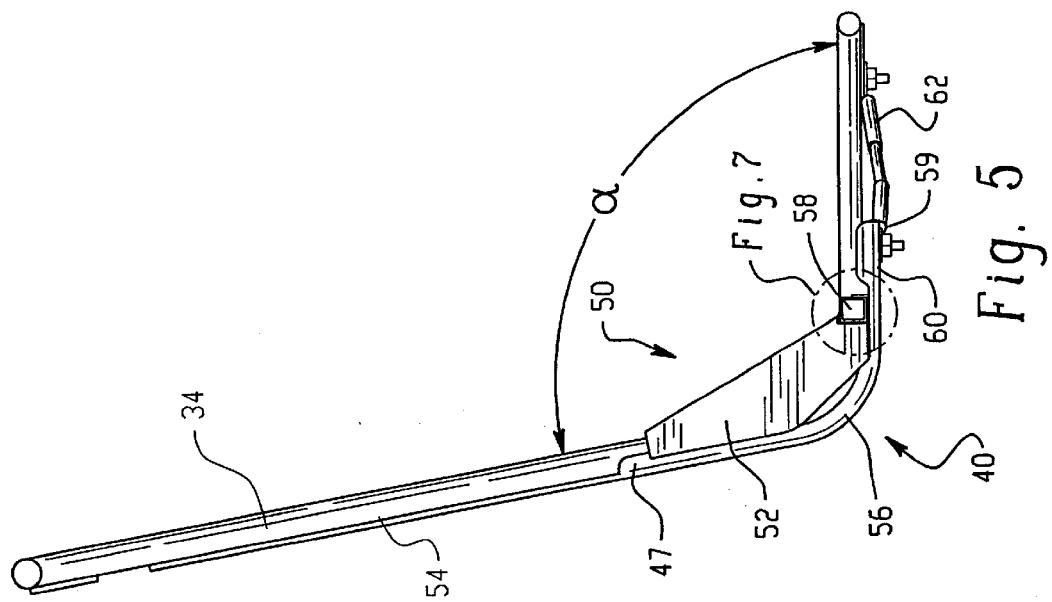
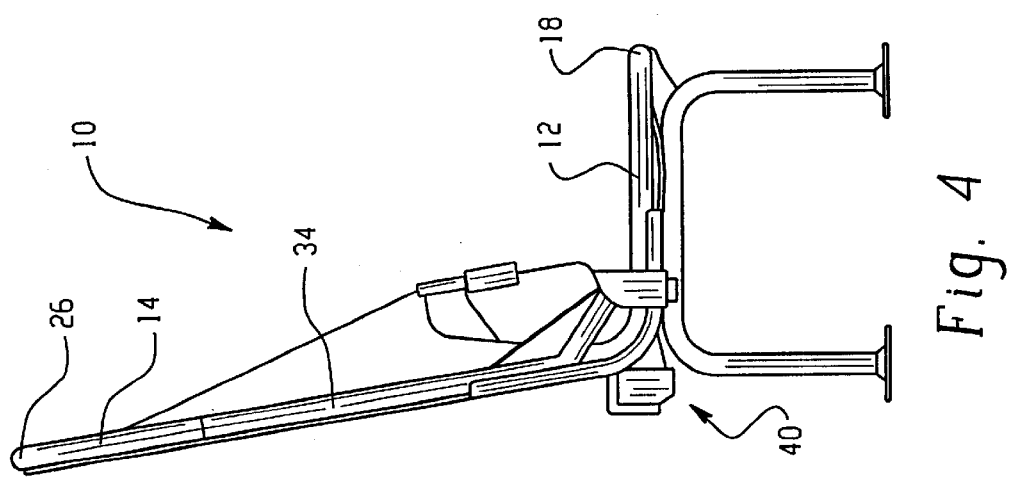

SHOCK ABSORBING VEHICLE SEAT FRAME

CROSS REFERENCE TO RELATED APPLICATIONS

This case is based on Provisional Applications Ser. No. 60/228,650, filed Aug. 29, 2000 and Ser. No. 60/168,010, filed Nov. 30, 1999, the disclosures of which are incorporated herein by reference.

FIELD OF THE INVENTION

The present invention relates to seats for use in motor vehicles, especially frames for bench-style school bus seats.

BACKGROUND

Recent federal safety standards mandate that conventional bench style seats as commonly found on most school buses be provided with suitable restraining systems such as seat belts or integrated lap/shoulder belts. In addition, they further mandate that the back rests of these seats give by a certain amount when impacted by a force exceeding a predetermined magnitude. In addition, they further mandate that these seats be rigid enough so that, when involved in a crash, they will keep a passenger sitting in the seat upright without any portion of the frame breaking or coming apart. See, for example, Federal Motor Vehicle Safety Standards (FMVSS) 222 and 210 (49 CFR §§571.210 & 571.222), which are incorporated by reference herein.

Current technology for designing crash resistant seating focuses on automobile and/or airplane seats. This technology has limited relevance to school bus seating where luxury and comfort are less important while simplicity and cost savings are more important.

Accordingly, it is an object of the present invention to provide a new crash resistant seat for use in a school bus or other vehicle which not only provides excellent crash resistance but also is simple and inexpensive to build.

SUMMARY OF THE INVENTION

This and other objects are accomplished by the present invention in accordance with which the frame of a crash-resistant seat is designed to undergo plastic flow or analogous phenomenon when an impact is applied to the back rest portion of the seat. In addition, one or more stopping mechanisms are provided in the seat frame to retard movement of the back rest farther than a predetermined limit. With this design, the back rest will move or "give" a suitable amount when hit from the rear by an unrestrained child, with at least a portion of the energy from this impact being absorbed by plastic flow of the frame or analogous phenomenon. Once the predetermined limit to this movement is reached, however, the stopping mechanism(s) cause the back rest to become essentially rigid with the seat, thereby retarding further movement of the back rest and hence keeping any passenger in the seat generally upright and safe.

Accordingly, the present invention provides a shock absorbing frame for making a crash-resistant vehicle seat, as well as a vehicle seat made from this frame, the frame being composed of a seat member and a back rest arranged at a first seating angle with respect to the seat member, the back rest being adapted to bend forward to a second seating angle upon application of an impact force of a predetermined magnitude to the back rest, an energy-absorbing part of the frame absorbing at least a portion of the impact force as the back rest moves from the first to second seating angles, the frame further including at least one stopping mechanism designed to make the back rest essentially rigid with respect to the seat member when the back rest reaches the second seating angle thereby keeping a passenger sitting in the vehicle seat substantially upright in his seat as a result of a crash.

Preferably, the inventive frame is made from simple readily-available, off-the-shelf steel tube and sheet stock and hence is simple in design and inexpensive to build.

BRIEF DESCRIPTION OF THE DRAWINGS

The present invention may be more readily understood by reference to the drawings wherein:

FIG. 4 is a side view of the seat frame of FIG. 3;

FIG. 5 is a partial side view of the inventive seat frame under normal conditions;

FIG. 6 is a partial side view of the inventive seat frame of FIG. 5 after a crash;

DETAILED DESCRIPTION

Figure 1:
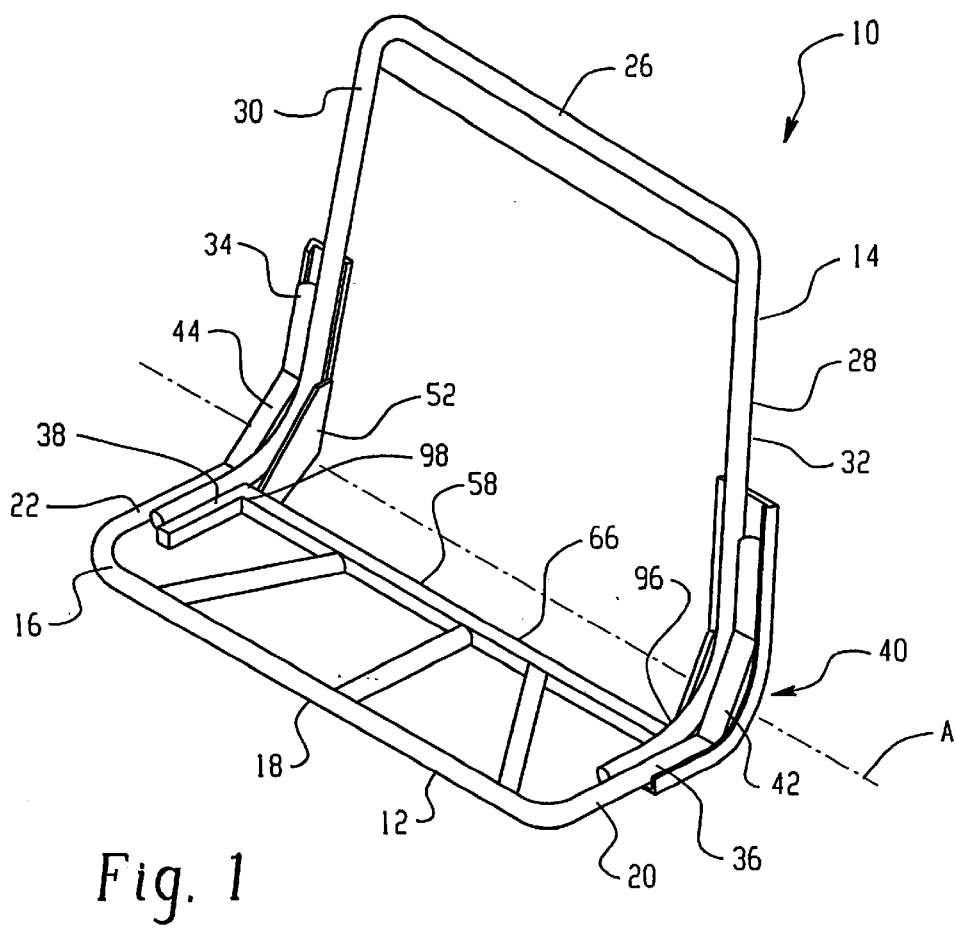
FIG. 1 is a perspective view of the inventive seat frame, illustrating a two-person bench seat made in accordance with the present invention.
Figure 2:
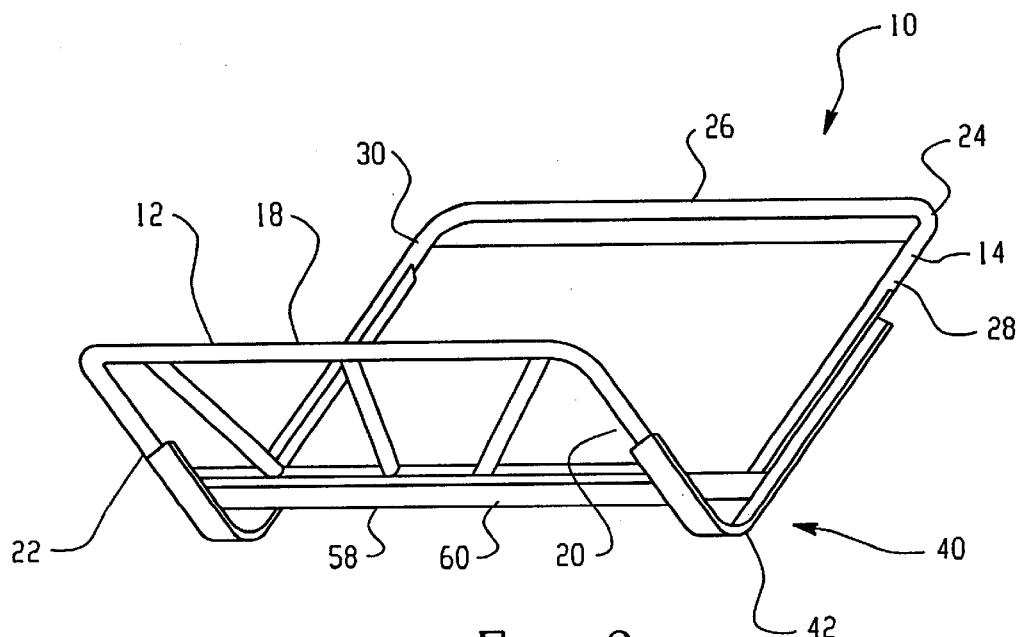
FIG. 2 is a further perspective view showing the underside of the seat frame of FIG. 1.
Figure 3:
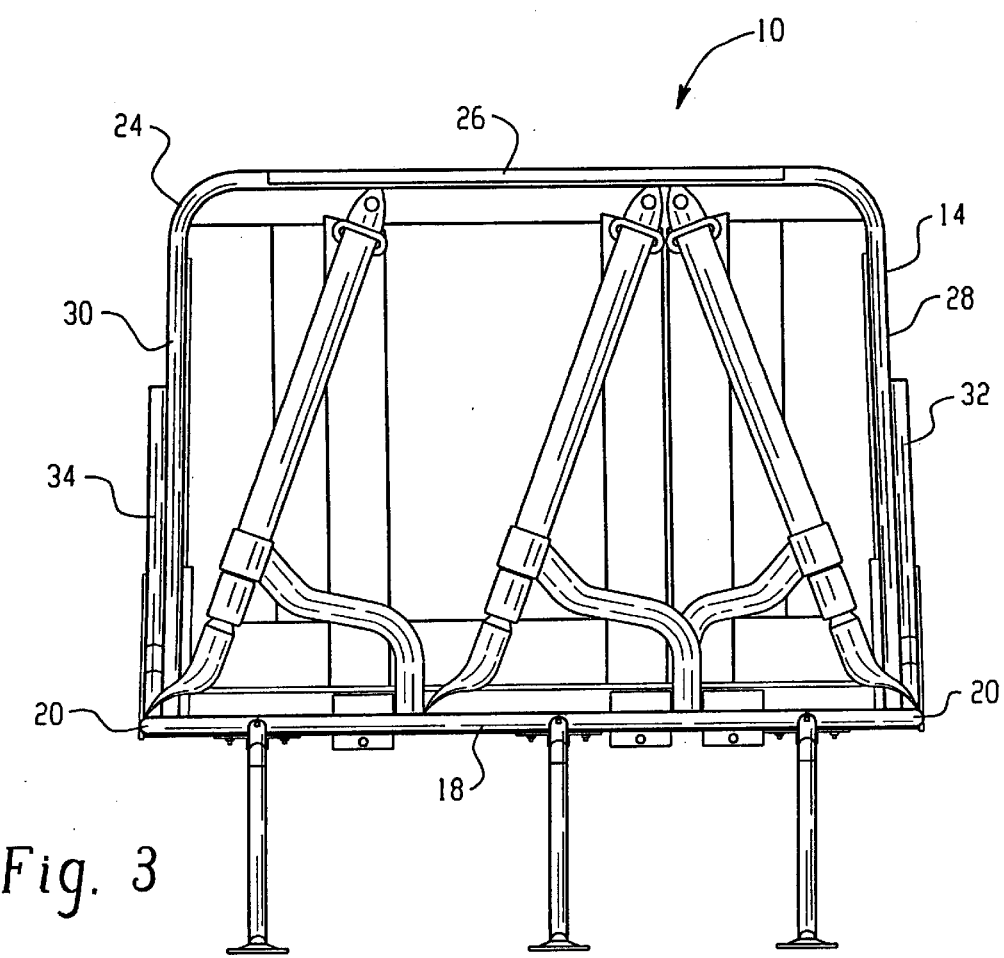
FIG. 3 is a front view of the inventive seat frame in a three-person bench seat embodiment, FIG. 3 further illustrating a suitable shoulder/lap harness assembly.

FIGS. 1 and 2 illustrate the inventive shock absorbing seat frame in a two-person, bench-style version, while FIGS. 3 and 4 illustrate the inventive seat frame in a three-person, bench-style version with suitable shoulder/lap harness assemblies being attached. FIGS. 5 to 8 are right side views which are generic to one, two and three-person versions the inventive seat frame. For convenience, no distinction is made in the following description between these different versions, as the novel features of the present invention as described below are common to all.

As shown in FIGS. 1 to 4, the inventive seat frame generally indicated at 10 is composed of a seat member or section 12 and a back rest or section 14. Seat member 12, which is securely mounted to the floor by means of floor supports 27 in the form of U-shaped tubes, is itself defined by a first U-shaped tube 16. As shown in FIGS. 1 and 2, base 18 of first U-shaped tube 16 is located in a forward portion of the seat member, while legs 20 and 22 of first U-shaped tube 16 extend from base 18 along the left and right sides of the seat member, respectively, towards a common axis A.

Back rest 14 is a single, unitary member in the sense that it is designed to receive and support the backs of all of passengers sitting in a seat made with the inventive frame. As best seen in FIGS. 1 and 3, back rest 14 is defined by second U-shaped tube 24 whose base 26 is located in an upper portion of the back rest and whose legs 28 and 30 extend from base 26 along the left and right sides of the seat member, respectively, also towards common axis A. Legs 20 and 22 of first U-shaped tube 16 are bent such that leg segments 32 and 34 at the ends of these legs extend into back rest 14. Similarly, legs 28 and 30 of second U-shaped tube 24 are bent such that leg segments 36 and 38 at the ends of these legs extend into seat member 12. With this structure, each of legs 20, 22, 28 and 30 forms a common frame element, that is a frame element which is common to both seat member 12 and back rest 14.

In the particular embodiment shown, legs 28 and 30 of second U-shaped tube 24 are arranged inside of legs 20 and 22 of first U-shaped tube 12 such that the legs from the two U-shaped tubes are in an overlapping, abutting, essentially parallel relationship in the seat and back portions of the inventive frame. In addition, the overlapping portions of these legs are joined together by spot welding along their abutting surfaces. Other arrangements can be used in lieu of joining the overlapping leg segments to integrate the first and second U-shaped tubes into a common, unitary seat frame.

As can be seen in FIGS. 1 and 2, each of legs 20, 22, 28 and 30 defines a transition portion 40 between seat member 12 and back rest 14 in the area of common axis A. In the particular embodiment shown, the transition portions of legs 28 and 30 define arcuate sections 43 (FIG. 2A), while the transition portions of legs 20 and 22 are formed by essentially straight brace sections 42 and 44.

When a school bus is involved in a front end crash, a significant forward-directed force may be applied to back rest 14. This force, which is shown at F in FIGS. 5 and 6, is derived from impact by an unrestrained child sitting in the next seat behind, from a shoulder harness worn by a child sitting in the seat, or both. In accordance with the present invention, transition portions 40 of the inventive frame are designed so that back member 12 will be maintained at a first seating angle α during normal conditions but will move to a second seating angle β when impact force F exceeds a predetermined magnitude. In addition, transition portions 40 are further, designed so that they will absorb at least a portion of this force as the back rest moves from seating angle β to seating angle β. In this context, "absorbing" means converting Force F into another form of energy such as heat, work or potential energy as opposed to redirecting the force to another direction. In addition, "normal conditions" means the conditions occurring when the seat is in a normal operating mode such as when it is occupied by a passenger or unoccupied. "Normal conditions" is thus distinguished from the conditions occurring during an accident when extremely high forces and stress are applied. In addition, "normal conditions" is also distinguished from the conditions occurring if the back rest were "unlocked" from the seat member such as occurs, for example, in most two door automobiles in which the front seats are provided with latching or locking mechanisms allowing the back rest of the front seat to be folded down or moved to allow access to the back seat. The inventive shock absorbing frame can also be provided with such a locking or latching assembly, and in that case the inventive frame would not be under "normal conditions" when the back rest were unlocked from the seat member.

Figure 2A:
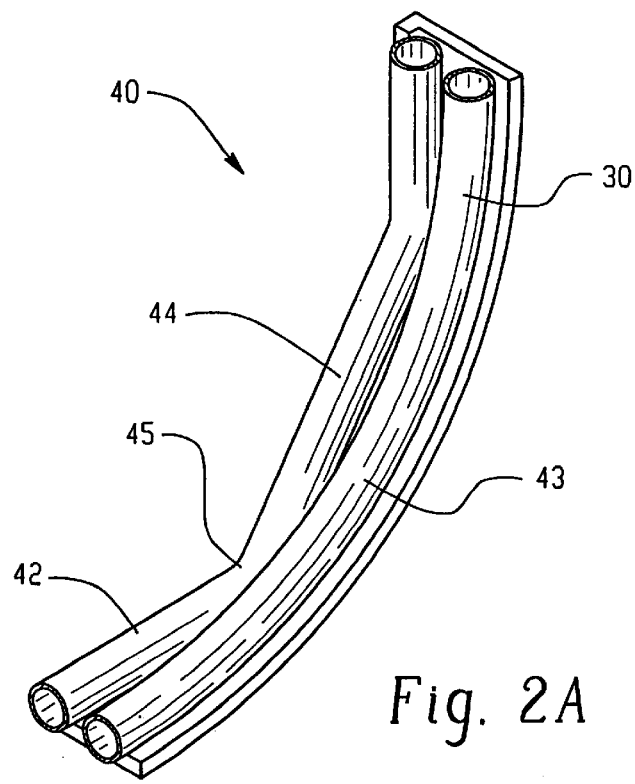
FIG. 2A is a partial perspective view showing a detail of the right side of the seat frame of FIGS. 1 and 2 as it transitions between its seat member and back rest.

In the particular embodiment shown, U-shaped tubes 16 and 24 are formed from 1 inch diameter, 14 gauge round steel tubing. This material is strong enough so that transition portions 40 of these U-shaped tubes can hold back rest 14 in position during normal conditions but weak enough so that transition portions 40 deform by plastic flow when a large-enough Force F is applied to back rest 14. Transition portions 40 of legs 28 and 30 (i.e. arcuate sections 43 as shown in FIG. 2A), being essentially arcuate in configuration, bend more or less uniformly along this arc. Transition portions 40 of legs 20 and 22 (i.e. straight brace sections 42 and 44 in FIG. 2A), on the other hand, are essentially straight braces with mitered ends. These transition portions tend to bend more in a more localized fashion at forward mitered junctions 45 of these braces, as shown in FIG. 2A. If desired, a suitable reinforcement such as a ⅝ inch diameter steel rod can be inserted into one or more of the transition portions 40 to provide greater or lesser stiffening, as desired. In any event, when a Force F of sufficiently great magnitude is applied to back rest 14, plastic deformation of transition portions 40 of the U-shaped tubes allows the back rest to move from seating angle α to seating angle β. At the same time, at least a portion of Force F is absorbed by transitions portions 40 in the form of the "work" performed on these transition portions to cause the plastic flow. This reduces the overall force that must be otherwise dissipated by the inventive frame, thereby helping to prevent injury to passengers in or behind a seat made with the inventive frame.

Once back rest 14 has moved to seating angle β, it is desirable that further substantial forward movement of the backrest be prevented to keep a passenger in the seat in an essentially upright position. To this end, the inventive seat frame is provided with at least one stopping mechanism designed to make the back rest essentially rigid with respect to the seat member when the back rest reaches seating angle β.

As shown in FIGS. 5 to 8, the inventive frame of the illustrated embodiment is provided with a first stopping mechanism which is composed of an abutment assembly generally indicated at 50. Abutment assembly 50 is composed of abutment member or gusset 52 which is rigidly secured to back rest 14 but which is unattached to seat member 12. In the particular embodiment shown, gusset 52 is formed from 10 gauge sheet steel and is welded to frame element section 54 which in turn is welded to leg segment 34 and leg 30 on the right side of back rest 14. Frame element section 54 is formed from an elongated section of 7 gauge sheet steel which is bent at 56 so that its lower, distal end 59 extends below and towards the front of seat member 12, as illustrated in these figures. An essentially vertically-oriented, forward-facing lip 47 is formed in frame element section 54 in the area of bend 56, and gusset 52 is welded to this lip. A second gusset 52, not shown, is attached in the same way to the left side of the inventive frame As illustrated in FIGS. 1 and 2, seat member 12 also includes a rearward frame element 58 in a rearward portion of the seat member. In the particular embodiment shown, rearward frame element 58 includes a section 60 of 7 gauge sheet steel rigidly secured to legs 20 and 22 of U-shaped tube 16. Steel section 60 is bent along its length to form a horizontal segment 62 and a vertical segment 64 and metal tube 66 having a square or rectangular cross-section is secured in the junction formed by these segments as by welding or the like.

Figure 7:
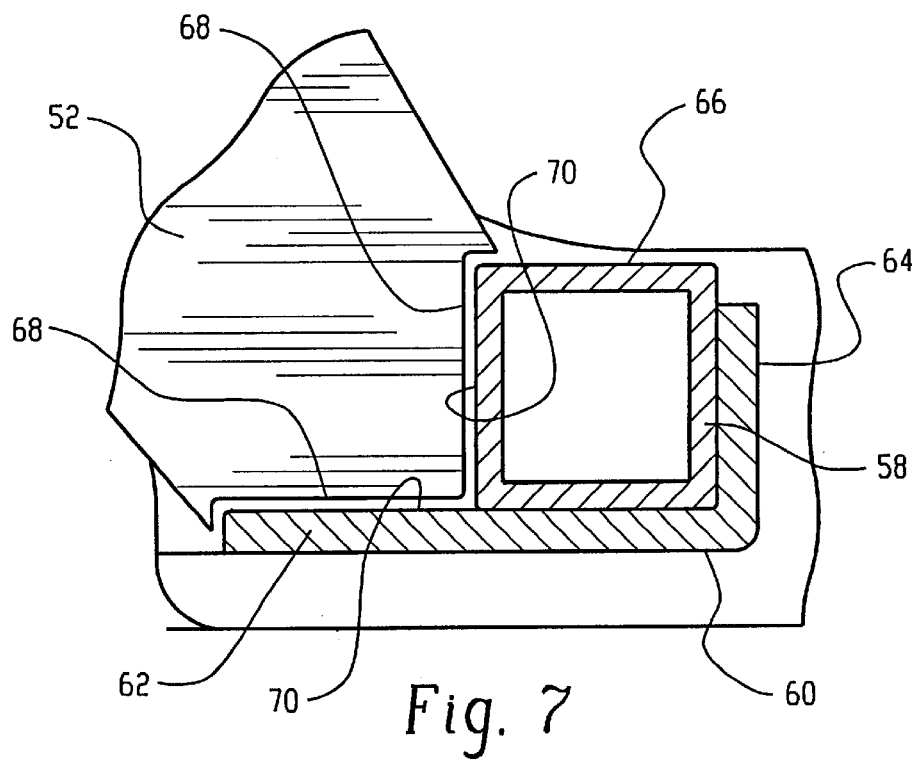
FIG. 7 is a blow-up of a portion of FIG. 5 illustrating the condition of one of the safety stopping mechanisms of the inventive seat frame under normal conditions.
Figure 8:
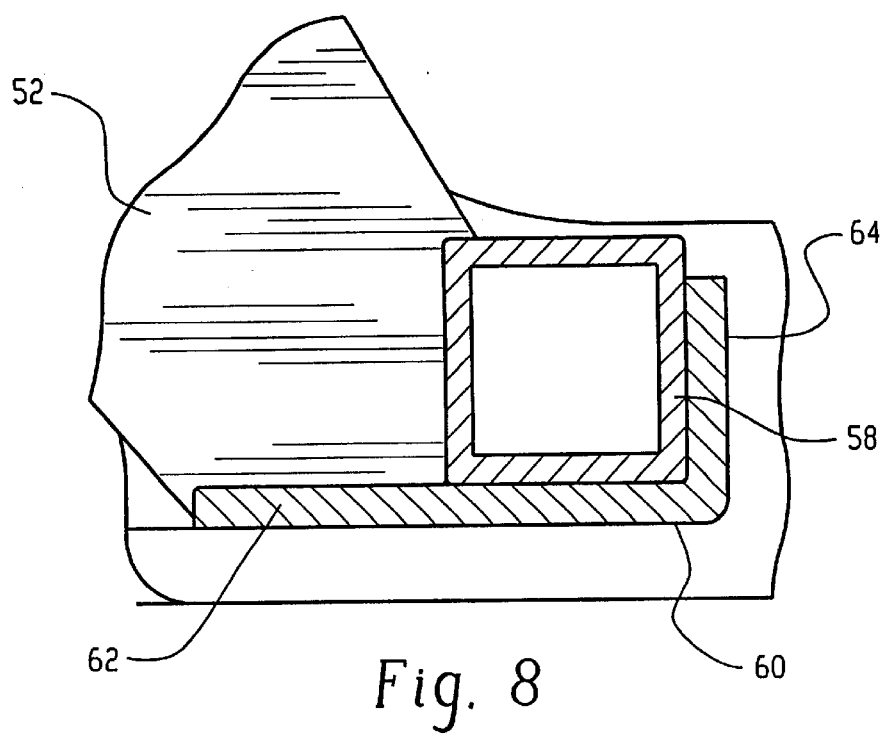
FIG. 8 is a blow-up view of a portion of FIG. 6, similar to FIG. 7, illustrating the condition of the safety stopping mechanism after a crash has occurred.

As illustrated in FIGS. 7 and 8, rearward frame element 58 of seat member 12 also forms a portion of abutment assembly 50 in that rearward frame element 58 acts as a bearing member defining cooperating abutting surfaces 68 and 70 with gusset 52. These cooperating abutting surfaces are designed to face one another in spaced-apart relationship when back rest 14 is positioned at seating angle α (FIG. 7) but to securely abut one another when back rest 14 is positioned at seating angle β (FIG. 8).

With this structure, back rest 14 can move away from seating angle α when an impact force F is applied to the back rest. However, when back rest 14 reaches seating angle β, gussets 52 engage rearward frame element 58, thereby making back rest 14 essentially rigid with respect to seat member 14. This in turn causes at least some of impact force F to be transmitted downwardly onto rearward frame element 58 and, in addition, a significant bending moment to be imparted onto this rearward frame element as well. The overall result is that further forward movement of back rest 14 is substantially retarded with additional portions of Force F being transmitted to the vehicle floor as well as to other parts of the inventive frame. If Force F is very large, the bending moment imparted to rearward frame element 58 will cause this reward frame element to deform by rotation, thereby absorbing more force through plastic flow. If the junctions 96 and 98 (FIG. 1) between rearward frame element 58 and legs 20 and 22 are sufficiently rigid, these legs will also deform, thereby absorbing still more of Force F through plastic flow.

In a particular embodiment of the invention, the inventive seat frame is provided with a second stopping mechanism to insure that back rest 14 does not move substantially passed seating angle β. As indicated above, distal end 59 of frame element section 54 extends below and towards the front of seat member 12. Distal end 59 is not attached to seat member 12 and therefore defines a swing arm 60 which remains in fixed spatial relationship with respect to the back rest as the back rest moves from seating angle α to seating angle β. By "fixed spatial relationship" is meant that the relative position of swing arm 60 with respect to back rest 14 remains essentially the same as the back rest travels from seating angle α to seating angle β. Thus, rotation of the back rest through a 20 degree arc of travel as a result of a crash, for example, causes swing arm 60 to also rotate by a similar amount so that the relative position of the swing arm and the back rest remains essentially the same.

A cable or tether 62 is attached between the distal end 59 of swing arm 60 and a forward portion of seat member 12, as shown in FIGS. 5 and 6. The length of tether 62 is chosen so that the tether becomes taut substantially simultaneously with gussets 52 engaging rearward frame element 58. Accordingly, movement of back rest 14 significantly passed seating angle β as a result of a crash, for example, is further prevented through tether 62 preventing further downward and rearward movement of swing arm 60.

In the particular embodiment shown, tether 62 is designed to become taut substantially simultaneously with gussets 52 engaging rearward frame element 58. However, tether 62 can be lengthened somewhat so as to achieve a small delay between engagement of the two stop mechanisms. This has the effect of transforming two stopping episodes (plastic flow of transition portions 40 followed by engagement of both stopping mechanisms) to three stopping episodes (plastic flow of transition portions 40 followed by engagement of the first stopping mechanism followed by engagement of the second stopping mechanism) thereby "smoothing out" the overall stopping action provided by the inventive seat frame.

From the above, it can be seen that the inventive seat frame is not only simple in design but also composed of readily-available off-the-shelf stock items of commerce. In addition, the inventive design allows for a high degree of design flexibility because the length of tether 62 and the stiffness of the reinforcements in transition portions 40 of the common frame elements can be easily changed to whatever performance characteristics are desired. The net effect is that crash resistant vehicle seats meeting a wide variety of different design criteria can be built with the inventive design far more easily and inexpensively than possible with earlier technology.

Although only a few embodiments of the present invention have been described above, it should be appreciated that many modifications can be made without departing from the spirit and scope of the invention. For example, although the present invention is directed primarily at providing frames for crash resistant vehicle seats, it is also directed at making seats incorporating these frames. To this end, FIGS. 3 and 4 illustrate one way shoulder/lap harnesses can be attached to the inventive frame. Other ways of attaching shoulder/lap harness and/or seat belts can, of course, also be used. Furthermore, although the foregoing disclosure has described seat member 12 and back rest 14 as being composed of U-shaped metal tubes and transition portions 40 as being composed of sections of these tubes, other structures and designs which perform the same or similar functions can be used. For example, instead of tubular steel, the seat member and back rest could be formed from angle iron stock, titanium metal or metal alloys, fiberglass-reinforced plastics and other materials. In addition, the common frame elements can be formed from separate elements and need not be formed from legs or extensions of other frame parts. In addition, three or more common frame elements can be provided instead of just two, one on the right side and the other on the left side of the frame, as specifically illustrated above. Moreover, the transition portion of a common frame elements need not be formed from a smaller portion of a larger frame element, but rather can be composed of one or more separate parts cooperating with the common frame element to provide the same or a similar function as described above. For example, a common frame element could be composed of separate element sections located in the back rest and seat member respectively, with the separate element sections being pivotally attached to one another through suitable release mechanisms and damping means (e.g. dashpots). All such modifications are intended to be included within the scope of the present invention, which is to be limited only by the following claims.

We claim:

1. A shock absorbing frame for making a crash-resistant vehicle seat composed of a seat member and a back rest arranged at a first seating angle with respect to the seat member, the back rest being adapted to bend forward to a second seating angle upon application of an impact force exceeding a predetermined magnitude to the back rest, a first energy-absorbing part of the frame for absorbing at least a portion of the impact force as the back rest moves from the first to second seating angles, the frame further including at least one stopping mechanism designed to make the back rest essentially rigid with respect to the seat member when the back rest reaches the second seating angle thereby keeping a passenger sitting in the vehicle seat substantially upright during a crash.

2. The frame of claim 1, wherein the first energy absorbing part of the frame maintains the back rest at the first seating angle under normal conditions but allows the back rest to move to the second seating angle when an impact force exceeding the predetermined magnitude is applied to the back rest.

3. The frame of claim 2, wherein the first energy absorbing part of the frame plastically deforms as the back rest bends forward from the first seating angle to the second seating angle.

4. The frame of claim 3, wherein the back rest and the seat member are formed from at least one common frame element, a transition portion of the common frame element defining the first energy absorbing part of the frame, the transition portion of the common frame element being adapted to undergo plastic deformation upon application of the impact force to the back rest.

5. The frame of claim 4, wherein the common frame element is a metal tube and further wherein the transition portion of the common frame element is an arcuate section of the tube.

6. The frame of claim 4, further including at least one occupant restraint attached to the seat member for securing a passenger on the seat member during a crash.

7. The frame of claim 3, wherein the frame includes at least two common frame elements, one common frame element being associated with the left side of the frame and another frame element being connected with the right side of the frame.

8. The frame of claim 7, wherein the seat member of the frame is defined by a first U-shaped metal tube and the back rest of the frame is defined by a second U-shaped metal tube, the legs of at least one of these U-shaped metal tubes defining the common frame elements.

9. The frame of claim 8, wherein the back rest generally pivots about a common axis as it moves from its first seating angle to its second seating angle, the base of the first U-shaped metal tube being arranged in a forward portion of the seat member with the legs of the first U-shaped metal tube extending from this base toward the common axis, the base of the second U-shaped metal tube being arranged in an upper portion of the back rest with the legs of the second U-shaped metal tube extending from this base toward the common axis.

10. The frame of claim 9, wherein the legs of the first and second U-shaped metal tubes join one another thereby defining the common frame elements.

11. The frame of claim 10, wherein the legs of the first U-shaped metal tube extend into the back rest, while the legs of the second U-shaped metal tube extend into the seat member whereby at least some of the common frame elements are defined by overlapping legs of the first and second U-shaped metal tubes.

12. The frame of claim 11, wherein the overlapping legs of the first and second U-shaped members are rigidly joined to one another along a substantial portion of their overlap.

13. The frame of claim 1, wherein the frame includes a first stopping mechanism comprising an abutment assembly defined by cooperating abutting surfaces in the back rest and seat member, the cooperating abutting surfaces abutting one another when the back rest moves from the first seating angle to the second seating angle.

14. The frame of claim 13, wherein the abutment assembly includes an abutment member secured to one of the back rest and the seat member and a cooperating bearing member secured to the other of the back rest and the seat member.

15. The frame of claim 14, wherein the abutment member is secured to a lower portion of the back rest and wherein the seat member includes at least one rearward frame element located in a rearward section of the seat member, the bearing member being integral with the rearward frame element.

16. The frame of claim 15, wherein the back rest and the seat member are formed from at least one common frame element, the common frame element defining a frame element section in the back rest of the frame, an abutment member being rigidly secured to the frame element section.

17. The frame of claim 16, wherein the back rest and the seat member are formed from at least two common frame elements, one common frame element being associated with the left side of the frame and another frame element being connected with the right side of the frame, the common frame elements being connected with one another in the seat member by the rearward frame element.

18. The frame of claim 17, wherein the rearward frame element is a metal tube having a rectangular cross-section.

19. The frame of claim 1, wherein the vehicle seat is a bench-type seat for receiving multiple passengers, the frame defining a single unitary back rest designed to receive and support all of the passengers sitting in the seat.

20. The frame of claim 1, further comprising a seat belt/shoulder harness assembly for each passenger sitting in the seat, each seat belt/shoulder harness assembly being connected at least to an upper portion of the back rest.

21. The frame of claim 1, wherein the stopping mechanism includes a swing arm extending from a lower portion of the back rest of the frame underneath the seat member of the frame, the swing arm being rigidly attached to the back rest so that the swing arm remains in fixed spatial relationship with respect to the back rest as the back rest moves from the first to the second seating angles.

22. The frame of claim 21, further comprising a stop member adapted to stop movement of the swing arm after the back rest has moved to the second seating angle.

23. The frame of claim 22, wherein the stop member is designed to stop movement of the swing arm substantially simultaneously with abutment of the back and seat members of the frame.

24. The frame of claim 22, wherein the stop member is a tether.

25. The frame of claim 22, wherein the back rest and the seat member are defined by at least one common frame element having a transition portion designed to undergo plastic flow as the back rest moves between the first and second seating angles.

26. The frame of claim 25, wherein the frame includes multiple common frame elements extending between the back rest and the seat member of the frame, the common frame elements being composed of metal tubes each defining a transition portion designed to undergo plastic flow as the back rest moves between the first and second seating angles, the metal tubes further defining frame element sections in the back rest of the frame, an abutment member being rigidly secured to each frame element section for abutting the seat member when the back rest moves to the second seating angle.

27. A vehicle seat incorporating the frame of claim 1.

28. A shock absorbing frame for making a crash resistant vehicle seat comprising a first steel tube defining a seat section and a second steel tube defining a back section, segments of the steel tube in at least one of the seat and back sections extending into the other section, transition portions of the extending segments being strong enough to maintain the back section fixed in a first position with respect to the seat section under normal conditions but weak enough to undergo plastic flow and thereby allow the back section to move forward when an impact force exceeding a predetermined magnitude is applied to the back section, the frame further including at least one stopping mechanism designed to prevent the impact force from moving the back section of the frame past a second predetermined position.

29. The frame of claim 28, wherein the first and second steel tubes are U-shaped and further wherein the legs of both U-shaped steel tubes extend into the other section.

30. The frame of claim 29, wherein the stopping mechanism is composed of a swing arm rigidly attached to the back section so that the swing arm remains in fixed spatial relationship with respect to the back section as the back section moves from its first to second positions.

31. The frame of claim 30, wherein the swing arm is composed of steel flat stock, rigidly secured to a steel tube in the back section.

32. The frame of claim 31, wherein the swing arm includes a base segment rigidly secured to a steel tube in the back section of the frame and an arm segment integral with the base and extending from a lower portion of the back section underneath the seat section of the frame.

33. The shock absorbing frame of claim 32, further comprising another stopping mechanism composed of an abutment member rigidly mounted with respect to a steel tube in one of the back section and the seat section of the frame and a cooperating bearing member rigidly mounted with respect to the steel tube in the other section of the frame.

34. A vehicle seat incorporating the frame of claim 28.

* * * * *